US009183876B1

(12) United States Patent
Sekii (10) Patent No.: US 9,183,876 B1
(45) Date of Patent: Nov. 10, 2015

(54) SPINDLE MOTOR AND DISK DRIVE APPARATUS (71) Applicant: Nidec Corporation, Kyoto (JP)

(72) Inventor: Yoichi Sekii, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/596,478

(22) Filed: Jan. 14, 2015

Related U.S. Application Data (60) Provisional application No. 62/005,028, filed on May 30, 2014.

(51) Int. Cl.
*G11B 19/20* (2006.01)
*H02K 7/08* (2006.01)

(52) U.S. Cl.
CPC ........ *G11B 19/2036* (2013.01); *G11B 19/2045* (2013.01); *H02K 7/086* (2013.01)

(58) Field of Classification Search
CPC . G11B 19/2036; G11B 19/2045; H02K 7/086
USPC ................................ 360/99.12; 310/67 R, 90
See application file for complete search history.

(56) References Cited

U.S. PATENT DOCUMENTS

| 5,457,588 | A | * | 10/1995 | Hattori et al. | 360/99.08 |
|---|---|---|---|---|---|
| 5,552,650 | A | | 9/1996 | Cap et al. | |
| 5,949,164 | A | | 9/1999 | Cap et al. | |
| 8,873,198 | B1 | * | 10/2014 | Iwasaki et al. | 360/99.08 |
| 2005/0104464 | A1 | | 5/2005 | Fujii et al. | |
| 2007/0188033 | A1 | * | 8/2007 | Hada | 310/90 |
| 2007/0210670 | A1 | | 9/2007 | Ueda et al. | |
| 2008/0218019 | A1 | * | 9/2008 | Sumi | 310/90 |
| 2010/0226601 | A1 | * | 9/2010 | Inazuka et al. | 384/107 |
| 2010/0321823 | A1 | * | 12/2010 | Oe et al. | 360/110 |
| 2011/0235210 | A1 | * | 9/2011 | Himeno et al. | 360/99.08 |
| 2012/0243397 | A1 | * | 9/2012 | Yamamoto et al. | 369/258.1 |
| 2012/0306304 | A1 | | 12/2012 | Kim et al. | |

(Continued)

FOREIGN PATENT DOCUMENTS

JP 02-101389 U 8/1990
JP 04-308438 A 10/1992

(Continued)

OTHER PUBLICATIONS

Sekii et al., "Spindle Motor, Electronics Device and Disk Drive Apparatus", U.S. Appl. No. 14/299,137, filed Jun. 9, 2014.

(Continued)

*Primary Examiner* — Angel Castro
(74) *Attorney, Agent, or Firm* — Keating & Bennett, LLP (57) ABSTRACT A motor includes a rotor hub with a first horizontal surface, a cylindrical surface, a second horizontal surface, and a projecting portion. The first horizontal surface is located above the sleeve. The cylindrical surface extends downward from the first horizontal surface. The second horizontal surface is located above a stator. The projecting portion projects downward from the second horizontal surface, and surrounds the sleeve or the holding portion. The cylindrical surface and an outer circumferential surface of the sleeve together define a tapered gap therebetween where the radial distance therebetween decreases with increasing height. The holding portion, the projecting portion, and coils are located radially in this order, and at least portions thereof are positioned to radially overlap with one another.

22 Claims, 8 Drawing Sheets

(56) References Cited

U.S. PATENT DOCUMENTS

| | | | |
|---|---|---|---|
| 2012/0326543 A1* | 12/2012 | Kimura et al. | 310/90 |
| 2013/0128379 A1* | 5/2013 | Mizukami et al. | 360/69 |
| 2014/0016229 A1* | 1/2014 | Sekii et al. | 360/99.08 |

FOREIGN PATENT DOCUMENTS

| | | |
|---|---|---|
| JP | 05-159450 A | 6/1993 |
| JP | 2001-248634 A | 9/2001 |
| JP | 2003-333798 A | 11/2003 |
| JP | 2006-331558 A | 12/2006 |

OTHER PUBLICATIONS

Sekii et al., "Spindle Motor and Motor Unit", U.S. Appl. No. 14/036,333, filed Sep. 25, 2013.

* cited by examiner

SPINDLE MOTOR AND DISK DRIVE APPARATUS

BACKGROUND OF THE INVENTION

1. Field of the Invention

The present invention relates to a spindle motor and a disk drive apparatus.

2. Description of the Related Art

Spindle motors arranged to rotate disks are installed in hard disk drive apparatuses and optical disk drive apparatuses. Such a spindle motor includes a stationary portion fixed to a housing of the apparatus, and a rotating portion arranged to rotate while supporting the disk(s). While the spindle motor is running, a torque centered on a central axis is produced by interaction of magnetic flux generated between the stationary portion and the rotating portion, so that the rotating portion is able to rotate with respect to the stationary portion. A known spindle motor is described, for example, in JP-A 2006-331558.

A so-called fluid dynamic bearing is used as a bearing of the spindle motor described in JP-A 2006-331558. The fluid dynamic bearing includes a stationary bearing portion, a rotatable bearing portion, and a lubricating fluid. A gap between the stationary bearing portion and the rotatable bearing portion is filled with the lubricating fluid. The rotating portion is supported by the fluid dynamic bearing to be rotatable with respect to the stationary portion.

If the fluid dynamic bearing as described above is used for a long period of time, the lubricating fluid in the fluid dynamic bearing gradually evaporates. If the amount of the lubricating fluid in the fluid dynamic bearing decreases, the rotatable bearing portion may become unable to rotate, or the rotatable bearing portion may come to rotate while being rubbed against the stationary bearing portion.

Accordingly, a structure which contributes to preventing evaporation of the lubricating fluid is demanded of a fluid dynamic bearing apparatus.

SUMMARY OF THE INVENTION

A spindle motor according to a preferred embodiment of the present invention includes a sleeve, a holding portion, a stator, and a rotor hub. The sleeve includes a bearing hole. The holding portion includes a hole or a recessed portion configured to accommodate a portion of the sleeve. The stator is located radially outside of the holding portion, and includes a plurality of coils. The rotor hub is rotatable about a central axis extending in a vertical direction. The rotor hub includes a circular first horizontal surface, a cylindrical surface in a shape of a cylinder, an annular second horizontal surface, and a projecting portion. The first horizontal surface is located above the sleeve. The cylindrical surface extends downward from the first horizontal surface. The second horizontal surface is located above the stator. The projecting portion projects downward from the second horizontal surface, and surrounds the sleeve or the holding portion. The cylindrical surface and an outer circumferential surface of the sleeve are configured to together define a tapered gap therebetween where a radial distance between the cylindrical surface and the outer circumferential surface of the sleeve decreases with increasing height. The tapered gap includes a liquid surface of a lubricating fluid defined therein. A portion of the tapered gap which is above the liquid surface is filled with the lubricating fluid. The holding portion, the projecting portion, and the coils are arranged radially in this order. At least portions of the holding portion, the projecting portion, and the coils are positioned to radially overlap with one another. An outer circumferential surface of the holding portion is located radially opposite to an inner circumferential surface of the projecting portion with a minute gap intervening therebetween. The minute gap has a radial width smaller than the radial distance between the cylindrical surface and the outer circumferential surface of the sleeve. The minute gap is located below the tapered gap.

In accordance with the spindle motor according to the above preferred embodiment of the present invention, the likelihood that a gas which has been evaporated through the liquid surface of the lubricating fluid will travel out of the spindle motor is significantly reduced, for example. As a result, a decrease in the amount of the lubricating fluid is significantly reduced or prevented.

A spindle motor according to another preferred embodiment of the present invention includes a sleeve, a holding portion, a stator, and a rotor hub. The sleeve includes a bearing hole. The holding portion includes a hole or a recessed portion configured to accommodate a portion of the sleeve. The stator is located radially outside of the holding portion, and includes a plurality of coils. The rotor hub is rotatable about a central axis extending in a vertical direction. The rotor hub includes a circular first horizontal surface, a cylindrical surface in a shape of a cylinder, an annular second horizontal surface, and a projecting portion. The first horizontal surface is located above the sleeve. The cylindrical surface extends downward from the first horizontal surface. The second horizontal surface is located above the stator. The projecting portion projects downward from the second horizontal surface, and surrounds the sleeve or the holding portion. The cylindrical surface and an outer circumferential surface of the sleeve are configured to together define a tapered gap therebetween where a radial distance between the cylindrical surface and the outer circumferential surface of the sleeve decreases with increasing height. The tapered gap includes a liquid surface of a lubricating fluid defined therein. A portion of the tapered gap which is above the liquid surface is filled with the lubricating fluid. The holding portion, the projecting portion, and the coils are located radially in an order named. At least portions of the holding portion, the projecting portion, and the coils are positioned to radially overlap with one another. An outer circumferential surface of the holding portion is located radially opposite to an inner circumferential surface of the projecting portion with a minute gap intervening therebetween. The minute gap has a radial width smaller than the radial distance between the cylindrical surface and the outer circumferential surface of the sleeve. The minute gap is located below the tapered gap. The rotor hub is defined by two or more members. A member including the cylindrical surface and a member including the inner circumferential surface of the projecting portion are separate members. The rotor hub further includes an inner member and an outer member. The inner member includes a first horizontal plate portion and an inner tubular portion. The first horizontal plate portion is circular, extends radially, and includes the first horizontal surface on a lower side thereof. The inner tubular portion is cylindrical, and extends downward from the first horizontal plate portion. The outer member includes a second horizontal plate portion and an outer tubular portion. The second horizontal plate portion is circular, extends radially, and includes the second horizontal surface on a lower side thereof. The outer tubular portion is cylindrical, extends upward from the second horizontal plate portion, and includes the cylindrical surface on a radially inner side thereof. The outer tubular portion is located radially outside of the inner tubular portion. The outer tubular portion is in direct contact with the inner tubular portion or in indirect contact with the inner tubular portion with another member intervening therebetween.

In accordance with the spindle motor according to the above other preferred embodiment of the present invention, the likelihood that a gas which has been evaporated through the liquid surface of the lubricating fluid will travel out of the spindle motor is significantly reduced, for example. As a result, a decrease in the amount of the lubricating fluid is significantly reduced or prevented. Further, because the rotor hub is defined by a plurality of members, it is possible to optimize the rotor hub by choosing an appropriate material for each portion in accordance with the required precision and strength thereof.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
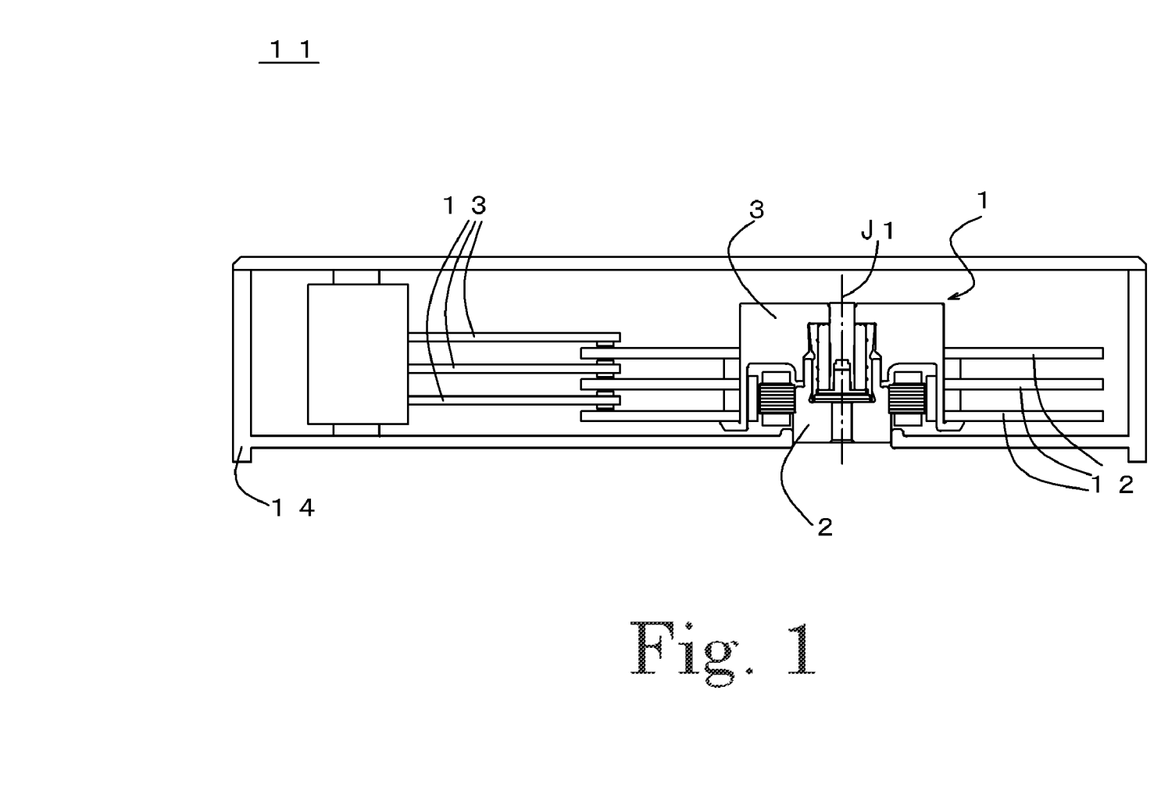
FIG. 1 is a cross-sectional view of a disk drive apparatus according to a preferred embodiment of the present invention.

It is assumed herein that a vertical direction is defined as a direction in which a central axis of a spindle motor extends, and that an upper side and a lower side along the central axis in FIG. 1 are referred to simply as an upper side and a lower side, respectively. It should be noted, however, that the above definitions of the vertical direction and the upper and lower sides are not meant to indicate relative positions or directions of different members or portions when they are actually installed in a device. Also note that a direction parallel to a central axis J1 is referred to by the term "axial direction", "axial", or "axially", that directions perpendicular to the central axis J1 are simply referred to by the term "radial direction", "radial", or "radially", and that a circumferential direction about the central axis J1 is simply referred to by the term "circumferential direction", "circumferential", or "circumferentially".

Also note that the terms "axial direction", "axial", and "axially" as used herein refer to not only a direction exactly parallel to the central axis J1 but also directions pointing in so nearly the same direction as the central axis J1 that practicability of the present invention may not be impaired, that is, substantially axial directions. Also note that the terms "radial direction", "radial", and "radially" as used herein refer to not only directions exactly perpendicular to the central axis J1 but also directions pointing in so nearly the same direction as any perpendicular to the central axis J1 that the practicability of the present invention may not be impaired, that is, radial or substantially radial directions. Also note that the terms "circumferential direction", "circumferential", and "circumferentially" as used herein refer to not only the circumferential direction about the central axis J1 but also a direction so nearly along the circumferential direction about the central axis J1 that the practicability of the present invention may not be impaired, that is, substantially circumferential directions.

Hereinafter, referring to FIGS. 1 and 2 appropriately, the structure of a spindle motor 1 according to a preferred embodiment of the present invention will be described. Hereinafter, the spindle motor 1 will be referred to simply as the motor 1. The motor 1 is preferably used, for example, in a hard disk drive apparatus, an optical disk drive apparatus, or the like. FIG. 1 is a cross-sectional view of a disk drive apparatus 11 according to a preferred embodiment of the present invention. As illustrated in FIG. 1, in the present preferred embodiment, the motor 1 is preferably used in the disk drive apparatus 11, for example. Note that the motor 1 is an outer-rotor motor.

The motor 1 includes a stationary portion 2 and a rotating portion 3. The disk drive apparatus 11 preferably includes, for example, three magnetic disks (hereinafter referred to simply as "disks") 12, an access portion 13, a housing 14, and the spindle motor 1. The disks 12 are supported by the rotating portion 3 of the spindle motor 1. The access portion 13 is configured to perform at least one of reading and writing of information from or to the disks 12. The housing 14 is configured to accommodate the motor 1, the disks 12, and the access portion 13.

Figure 2:
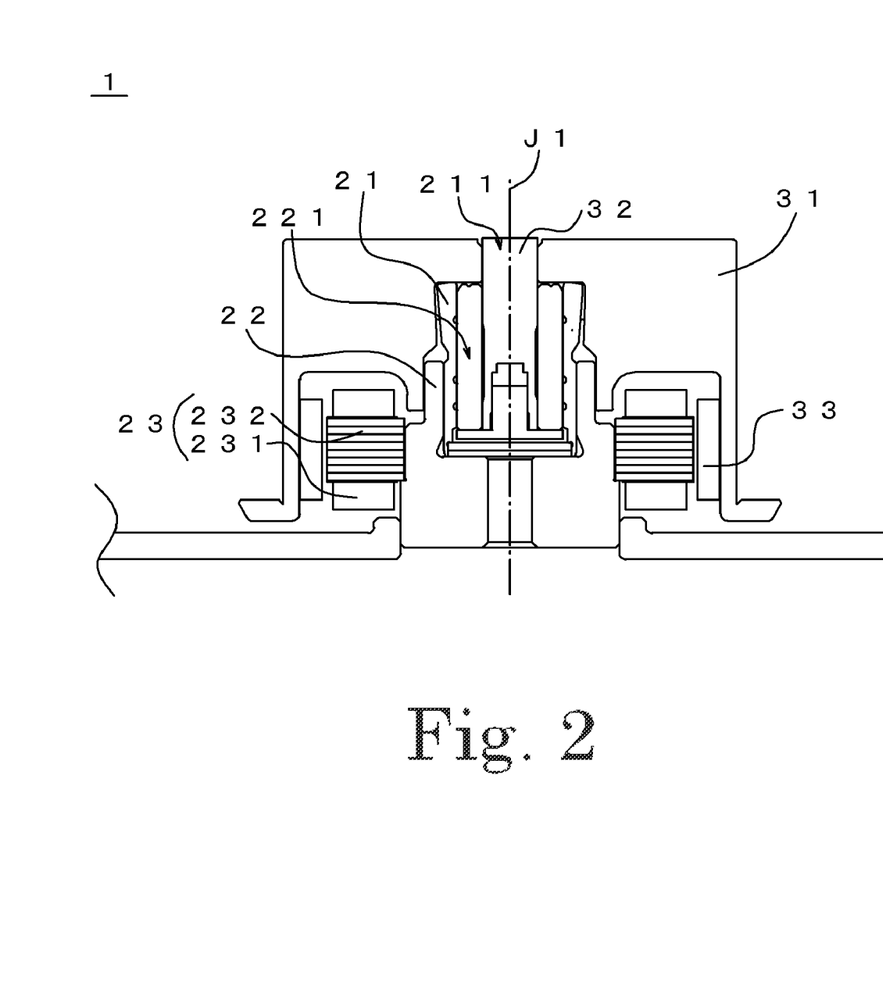
FIG. 2 is a cross-sectional view of a spindle motor according to a preferred embodiment of the present invention.

FIG. 2 is a cross-sectional view of the motor 1 according to an exemplary preferred embodiment of the present invention. In FIG. 2, the disks 12 are not shown. The motor 1 preferably includes a sleeve 21, a holding portion 22, a stator 23, and a rotor hub 31. The sleeve 21 includes a bearing hole 211. A portion of the shaft 32 is accommodated in the bearing hole 211. The holding portion 22 includes a hole or a recessed portion configured to accommodate a portion of the sleeve 21. According to the present preferred embodiment, the holding portion 22 includes a recessed portion 221 configured to accommodate a portion of the sleeve 21. The stator 23 is located radially outside of the holding portion 22. In addition, the stator 23 preferably includes a plurality of coils 231. The rotor hub 31 is rotatable about the central axis J1, which extends in a vertical direction. According to the present preferred embodiment, the shaft 32 and the rotor hub 31 are defined by separate members, and the rotor hub 31 is fixed to a top portion of the shaft 32 through adhesion, press fitting, or the like. Note, however, that the shaft 32 and the rotor hub 31 may alternatively be defined by a single monolithic member.

The stator 23 includes a stator core 232 and the plurality of coils 231. The stator core 232 is preferably defined by, for example, laminated steel sheets. The laminated steel sheets are defined by a plurality of electromagnetic steel sheets (for example, silicon steel sheets) placed one upon another in the axial direction. The electromagnetic steel sheets placed one upon another are fixed to one another through, for example, crimping, welding, or the like. The stator core 232 includes a plurality of teeth (not shown) and a core back (not shown). The core back is annular or substantially annular. The plurality of teeth are arranged to extend radially outward from an outer circumferential surface of the core back (not shown).

The teeth are preferably arranged at regular intervals in the circumferential direction on the outer circumferential surface of the core back (not shown).

Each coil 231 is defined by at least one conducting wire (not shown) wound around a corresponding one of the teeth. According to this preferred embodiment, the motor 1 preferably is a three-phase motor. Therefore, the plurality of coils 231 are defined by at least three conducting wires. Each conducting wire is used to supply an electric current of one of three phases. An end portion of each conducting wire is electrically connected to a circuit board (not shown). Note that "to be electrically connected" means "to be in electrical continuity". The conducting wires include a common wire and three conducting wires used to supply the electric currents of the three phases. The end portion of each conducting wire is connected to the circuit board through, for example, soldering or the like.

According to the preferred embodiment described above, a flexible printed circuit board is preferably used as the circuit board. The flexible printed circuit board has a smaller axial thickness than that of other types of boards. Thus, an increase in the axial dimension of the motor 1 is significantly reduced.

The rotor hub 31 includes a rotor magnet 33. More specifically, the rotor magnet 33 is located on an inner circumferential surface of the rotor hub 31. According to this preferred embodiment, the rotor magnet 33 is cylindrical or substantially cylindrical. Note that, in place of the rotor magnet 33, a plurality of magnets may be arranged in the circumferential direction. The rotor magnet 33 is fixed to the inner circumferential surface of the rotor hub 31 through, for example, an adhesive, press fitting, or the like. Note, however, that the rotor magnet 33 may alternatively be fixed to the inner circumferential surface of the rotor hub 31 by another method.

Further, a back iron may be located between the rotor magnet 33 and the inner circumferential surface of the rotor hub 31. In this case, the back iron is preferably cylindrical, and the rotor magnet 33 is located on an inner circumferential surface of the back iron. The back iron is preferably made of a magnetic material.

Figure 3:
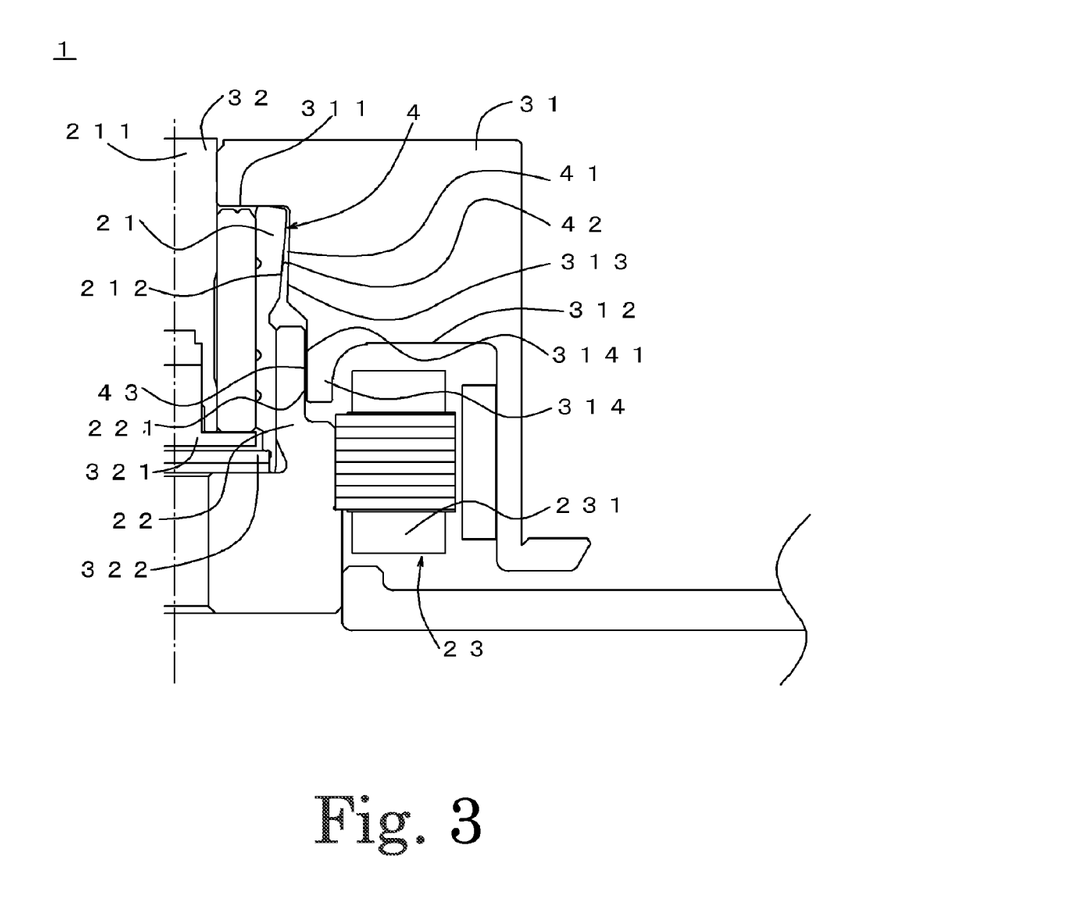
FIG. 3 is a partial cross-sectional view of the spindle motor according to a preferred embodiment of the present invention.

The motor 1 will now be described in detail below with reference to FIG. 3. FIG. 3 is a partial cross-sectional view of the motor 1 according to a preferred embodiment of the present invention. The rotor hub 31 according to the present preferred embodiment preferably includes a circular first horizontal surface 311, a cylindrical surface 313 in the shape of a cylinder, and an annular second horizontal surface 312. The first horizontal surface 311 is located axially above the sleeve 21. The cylindrical surface 313 extends downward from the first horizontal surface 311. The second horizontal surface 312 is located above the stator 23. The rotor hub 31 includes a projecting portion 314. The projecting portion 314 is located radially inward of the second horizontal surface 312, and projects downward. The projecting portion 314 surrounds the sleeve 21 or the holding portion 22. The projecting portion 314 according to the present preferred embodiment surrounds both the sleeve 21 and the holding portion 22.

A tapered gap 4 is defined between the cylindrical surface 313 and an outer circumferential surface 212 of the sleeve 21. The radial dimension of the tapered gap 4, that is, the radial distance between the cylindrical surface 313 and the sleeve 21, decreases with increasing height. A liquid surface 42 of a lubricating fluid 41 is defined in the tapered gap 4, and a portion of the tapered gap 4 which is above the liquid surface 42 is filled with the lubricating fluid 41. Accordingly, a gap between an upper surface of the sleeve 21 and the first horizontal surface 311 and a gap between an inner circumferential surface of the sleeve 21 and an outer circumferential surface of the shaft 32 are filled with the lubricating fluid 41.

In the preferred embodiment illustrated in FIG. 3, a stopper 321 is located at a bottom portion of the shaft 32. The stopper 321 is a portion extending radially outward from the bottom portion of the shaft 32. In the preferred embodiment illustrated in FIG. 3, the shaft 32 and the stopper 321 preferably are defined by separate members. Note, however, that the shaft 32 and the stopper 321 may alternatively be defined by a single continuous monolithic member.

The sleeve 21 is cylindrical or substantially cylindrical, and includes the bearing hole 211. The bearing hole 211 passes through the sleeve 21 in the axial direction. The shaft 32 passes through the bearing hole 211. A cap 322 is located at an axially lower opening of the sleeve 21. In other words, the axially lower opening of the sleeve 21 is covered with the cap 322. The cap 322 is located axially opposite to a lower surface of the stopper 321.

Figure 4:
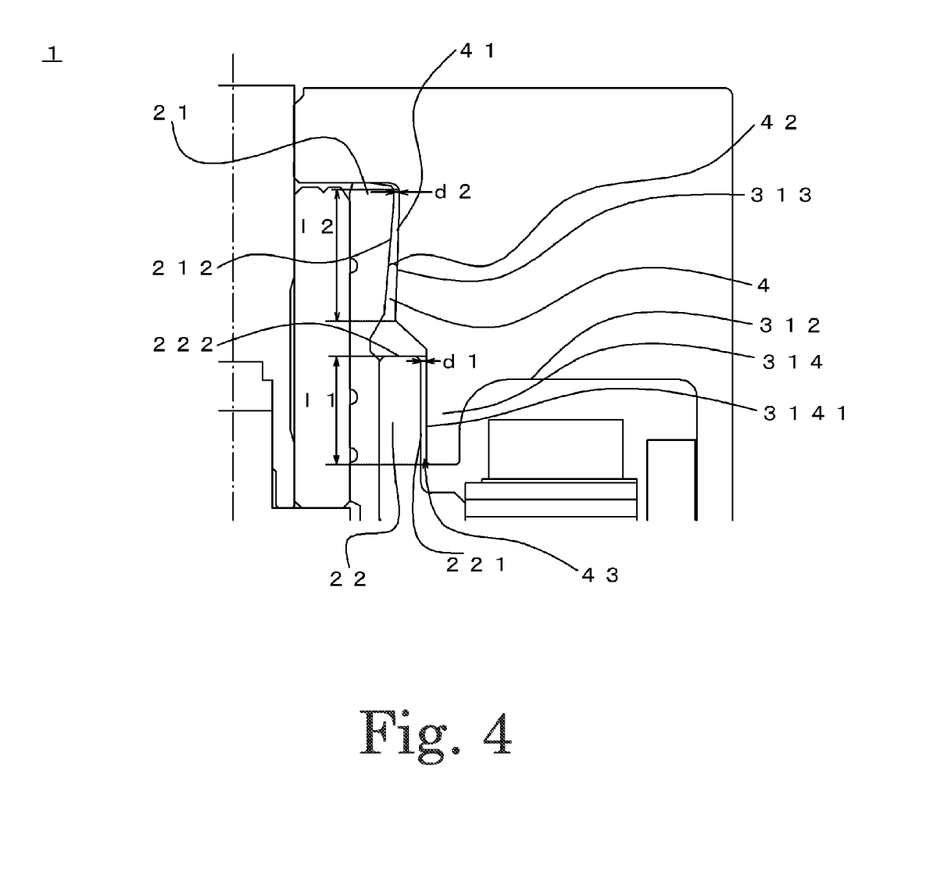
FIG. 4 is a partial cross-sectional view of the spindle motor according to a preferred embodiment of the present invention.

A minute gap 43 will now be described in detail below with reference to FIG. 4. FIG. 4 is a partial cross-sectional view of the motor 1 according to a preferred embodiment of the present invention. An outer circumferential surface 221 of the holding portion 22 is located radially opposite to an inner circumferential surface 3141 of the projecting portion 314 with the minute gap 43 intervening therebetween. Provision of the minute gap 43 contributes to preventing a gas including a portion of the lubricating fluid 41 which has been evaporated through the liquid surface 42 (hereinafter referred to as a "gas") from traveling out of the motor 1 through the minute gap 43. Thus, a space extending from the tapered gap 4 to the minute gap 43 (hereinafter referred to as a "space") is filled with the aforementioned gas, approaching a saturated state. This contributes to preventing the lubricating fluid 41 from evaporating through the liquid surface 42. This in turn contributes to preventing a reduction in the amount of the lubricating fluid 41 due to evaporation of the lubricating fluid 41.

The smaller the radial width of the minute gap 43 is, the more remarkably the above-described effect is achieved. A maximum radial width d1 of the minute gap 43 preferably is at least smaller than a minimum radial distance d2 between the cylindrical surface 313 and the outer circumferential surface 212 of the sleeve 21. However, the radial width of the minute gap 43 according to the present preferred embodiment preferably is in the range of about 5 μm to about 200 μm, more preferably, in the range of about 20 μm to about 180 μm, for example. The above-described effect cannot be achieved sufficiently if the radial width of the minute gap 43 is greater than about 200 μm, for example. Meanwhile, due to limitations in term of manufacturing, it is difficult to reduce the radial width of the minute gap 43 to less than about 5 μm, for example.

In the motor 1 according to the present preferred embodiment, the holding portion 22, the projecting portion 314, and the coils 231 are located radially in the order named. Further, at least portions of the holding portion 22, the projecting portion 314, and the coils 231 are positioned to radially overlap with one another. Furthermore, the minute gap is located below the tapered gap 4. The above structure prevents the minute gap 43 and the tapered gap 4 from radially overlapping with each other, and therefore allows the minute gap to be arranged more radially inward. This contributes to reducing the size of the aforementioned space, allowing the aforementioned space to reach the saturated state with a smaller amount of gas. This contributes to preventing the lubricating fluid 41 from evaporating through the liquid surface 42. Note that, according to the present preferred embodiment, the inner circumferential surface of the projecting portion 314 is located radially outward of the cylindrical surface 313, and the tapered gap 4 is located radially inward of the minute gap 43.

In addition, an upper surface 222 of the holding portion 22 is preferably located at an axial level higher than an axial level of the second horizontal surface 312. This contributes to increasing the axial dimension 11 of the minute gap 43. This in turn contributes to increasing a time required for the gas to pass through the minute gap 43, and to preventing the gas from traveling out of the motor 1.

In addition, the axial dimension 12 of the tapered gap is preferably greater than the axial dimension 11 of the minute gap 43. This allows a greater amount of the lubricating fluid 41 to be stored in the tapered gap 4.

Figure 5:
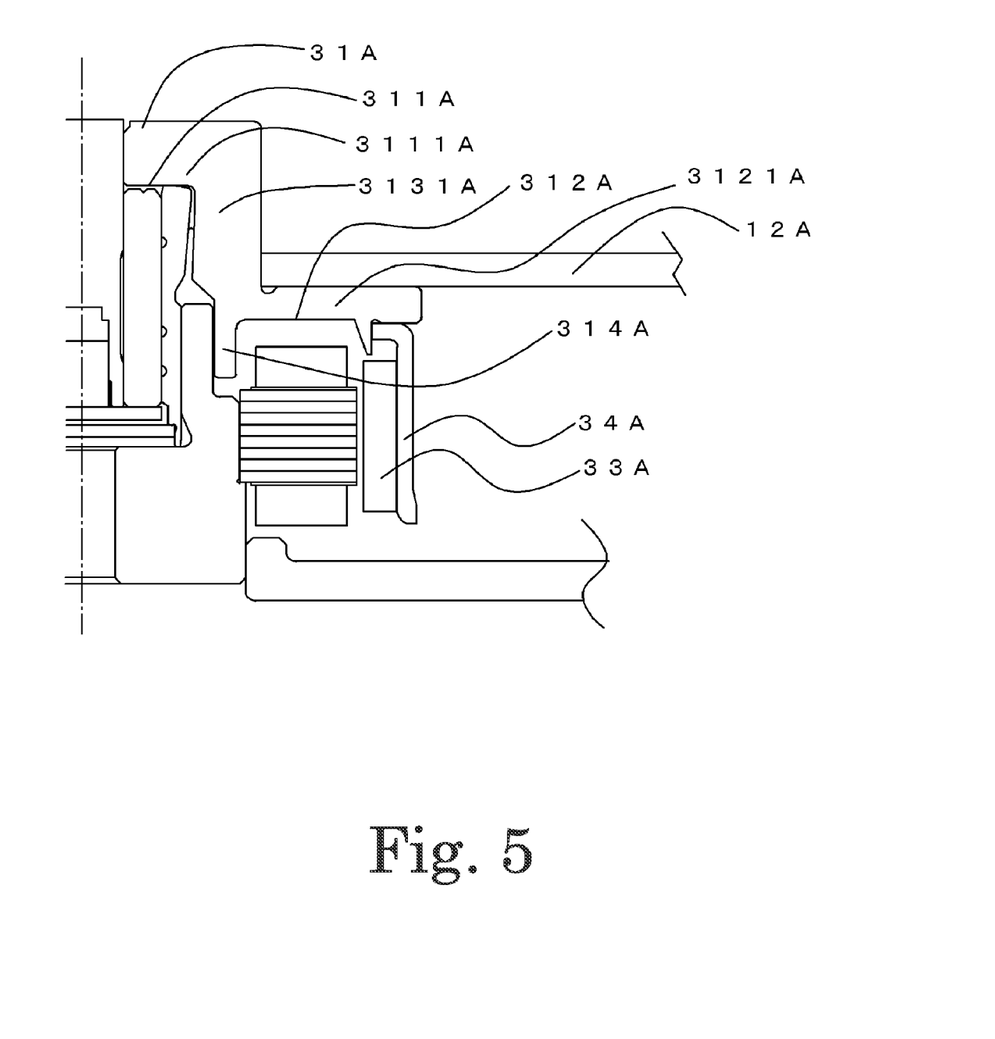
FIG. 5 is a partial cross-sectional view of a spindle motor according to an example modification of a preferred embodiment of the present invention.

Next, an example modification of the above-described preferred embodiment of the present invention will be described below. FIG. 5 is a partial cross-sectional view of a spindle motor according to an example modification of the above-described preferred embodiment of the present invention. Note that, in the following description, a description of any feature which is also found in the above-described preferred embodiment illustrated in FIGS. 1 to 4 will be omitted.

In the example modification illustrated in FIG. 5, a rotor hub 31A preferably includes a circular first horizontal plate portion 3111A, a cylindrical tubular portion 3131A, and a circular second horizontal plate portion 3121A. The first horizontal plate portion 3111A extends radially, and includes a first horizontal surface 311A on a lower side thereof. The tubular portion 3131A extends downward from the first horizontal plate portion 3111A. The second horizontal plate portion 3121A extends radially from the tubular portion 3131A, and includes a second horizontal surface 312A on a lower side thereof. In addition, a projecting portion 314A is located radially inward of the second horizontal surface 312A, and projects downward from the second horizontal surface 312A.

In addition, as illustrated in FIG. 5, at least one disk 12A may be located on the second horizontal plate portion 3121A. Further, a back iron 34A may be located on the second horizontal surface 312A, and a magnet 33A may be located on an inner circumferential surface of the back iron 34A. That is, the rotor hub 31A may be defined by two or more members.

Figure 6:
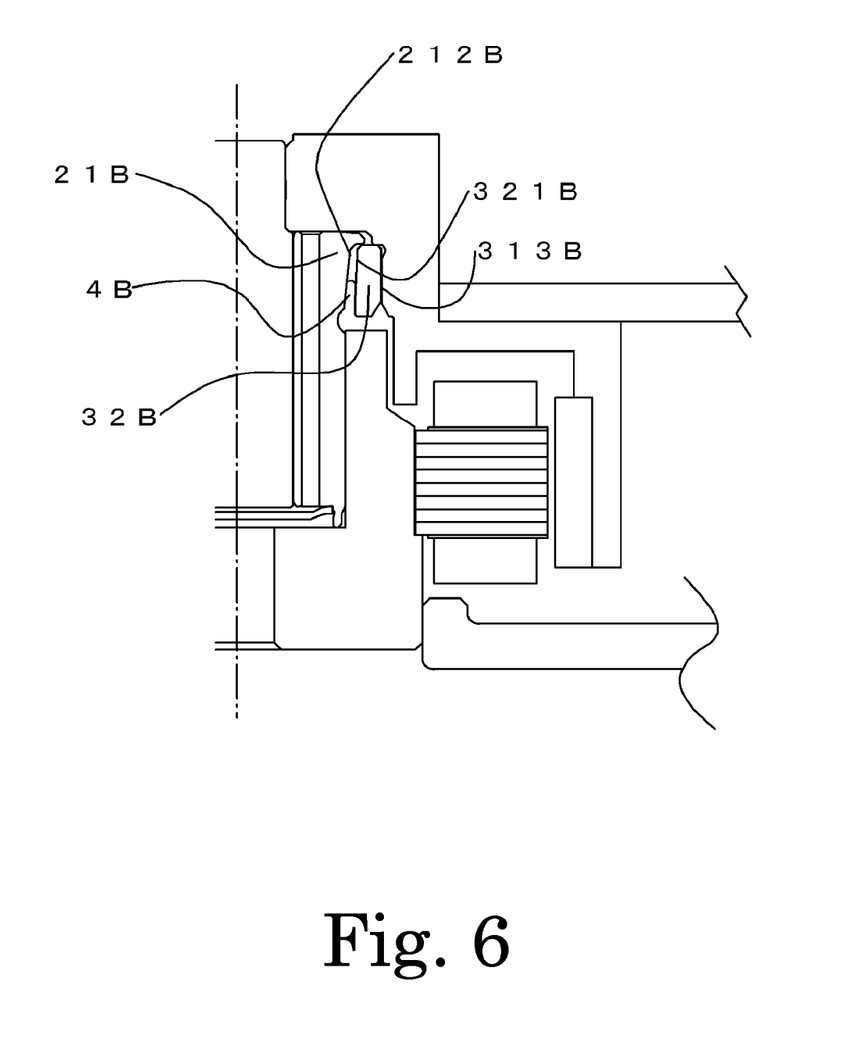
FIG. 6 is a partial cross-sectional view of a spindle motor according to another example modification of a preferred embodiment of the present invention.

In addition, as illustrated in FIG. 6, another member may be located on a cylindrical surface 313B. In an example modification of the above-described preferred embodiment illustrated in FIG. 6, an annular bushing 32B is located on the cylindrical surface 313B. In this case, a tapered gap 4B is defined between an outer circumferential surface 212B of a sleeve 21B and an inner circumferential surface 321B of the bushing 32B. That is, in the example modification illustrated in FIG. 6, the inner circumferential surface 321B of the bushing 32B plays the same role as that of the cylindrical surface according to the above-described preferred embodiment.

Figure 7:
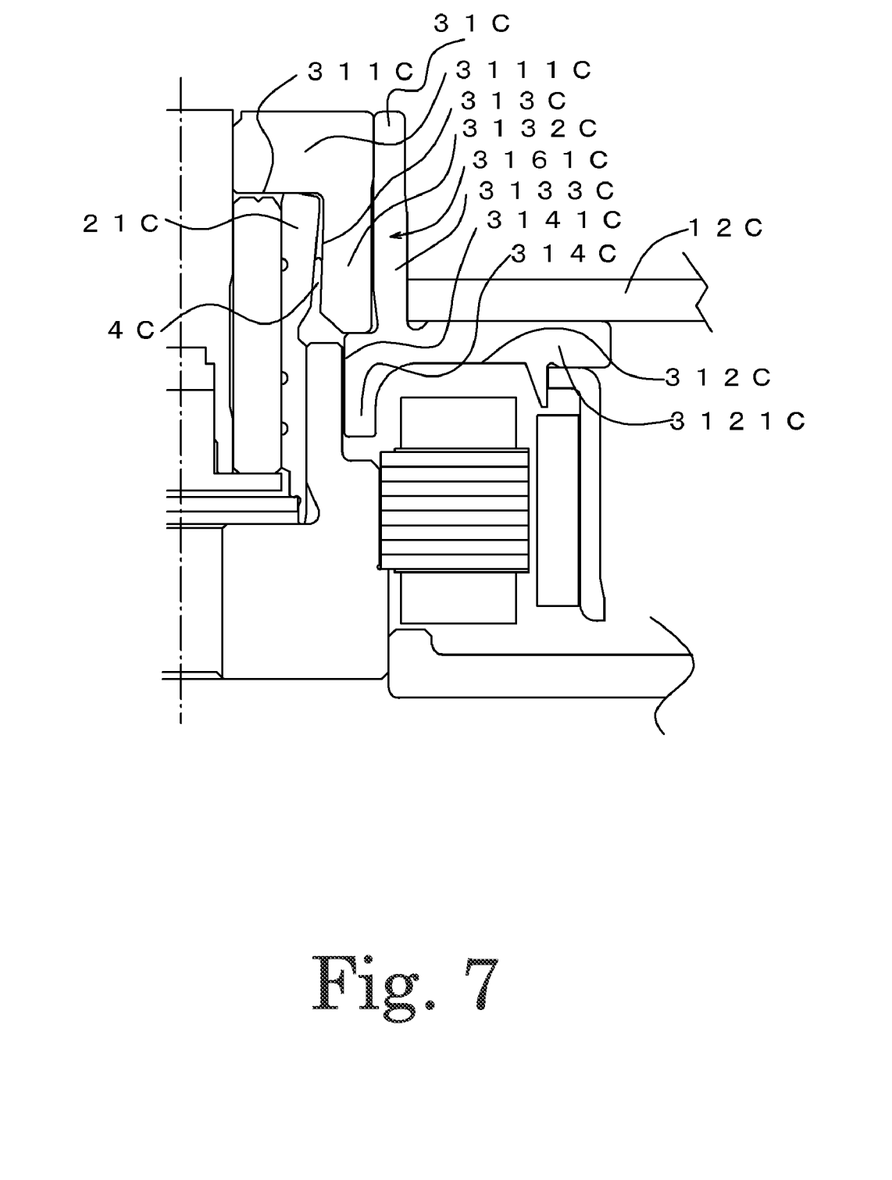
FIG. 7 is a partial cross-sectional view of a spindle motor according to another example modification of a preferred embodiment of the present invention.

In addition, as illustrated in FIG. 7, a rotor hub 31C may be defined by two or more members. In an example modification of the above-described preferred embodiment illustrated in FIG. 7, a member including a cylindrical surface 313C and a member including an inner circumferential surface 3141C of a projecting portion 314C preferably are separate members. More specifically, the rotor hub 31C includes an inner member 315C and an outer member 316C. The inner member 315C preferably includes a circular first horizontal plate portion 3111C and a cylindrical inner tubular portion 3132C. The first horizontal plate portion 3111C extends radially, and includes a first horizontal surface 311C on a lower side thereof. The inner tubular portion 3132C extends downward from the first horizontal plate portion 3111C, and includes the cylindrical surface 313C on a radially inner side thereof. The outer member 316C preferably includes a circular second horizontal plate portion 3121C and a cylindrical outer tubular portion 3133C. The second horizontal plate portion 3121C extends radially, and includes a second horizontal surface 312C on a lower side thereof. The outer tubular portion 3133C extends upward from the second horizontal plate portion 3121C.

As illustrated in FIG. 7, the outer tubular portion 3133C is located radially outside of the inner tubular portion 3132C. In addition, the outer tubular portion 3133C is in direct contact with the inner tubular portion 3132C or in indirect contact with the inner tubular portion 3132C with another member intervening therebetween. For example, in the case where the outer tubular portion 3133C is fixed to the inner tubular portion 3132C through only press fitting, the outer tubular portion 3133C is in direct contact with the inner tubular portion 3132C. Meanwhile, in the case where an adhesive is used in addition to press fitting or insertion, for example, the outer tubular portion 3133C is in indirect contact with the inner tubular portion 3132C with another member, i.e., the adhesive, intervening therebetween. That is, the adhesive may be located between an inner circumferential surface of the outer tubular portion 3133C and an outer circumferential surface of the inner tubular portion 3132C. Thus, the inner member 315C and the outer member 316C are securely fixed to each other. Note that the other member is not limited to the adhesive. For example, an adhesive tape, a bushing, or the like may be located between the inner circumferential surface of the outer tubular portion 3133C and the outer circumferential surface of the inner tubular portion 3132C. Also note that an adhesive may be located between a lower surface of the inner tubular portion 3132C and an upper surface of the second horizontal plate portion 3121C.

When the rotor hub 31C is defined by a plurality of members as described above, it is possible, for example, to use stainless steel, which has a high Young's modulus, for a portion which is in contact with a sleeve 21C, such as the first horizontal surface 311C, and use aluminum or iron, which works easily, for another portion including the second horizontal surface 312C. That is, it is possible to optimize the rotor hub 31C by choosing an appropriate material for each portion in accordance with the required precision and strength thereof.

Further, as in the example modification illustrated in FIG. 7, the outer tubular portion 3133C may include a press fit portion 3161C extending upward from the outer tubular portion 3133C. In this case, an inner surface of the press fit portion 3161C is in direct contact with an outer circumference of the inner tubular portion 3132C or in indirect contact with the outer circumference of the inner tubular portion 3132C with another member intervening therebetween. This arrangement makes it less likely for a deformation which may occur when the inner member 315C and the outer member 316C are fitted to each other to affect a tapered gap 4C and a disk 12C.

In addition, in the example modification illustrated in FIG. 7, the press fit portion 3161C is located at an axial level higher than an axial level of an upper surface of the sleeve 21C. This arrangement makes it still less likely for a deformation which may occur when the inner member 315C and the outer member 316C are fitted to each other to affect the tapered gap 4C and the disk 12C.

According to the present example modification, the lower surface of the inner tubular portion 3132C is in contact with the upper surface of the second horizontal plate portion 3121C. In other words, the lower surface of the inner tubular portion 3132C is brought into contact with the upper surface of the second horizontal plate portion 3121C. This arrangement makes it possible to fit the inner member 315C and the outer member 316C to each other with high precision.

Figure 8:
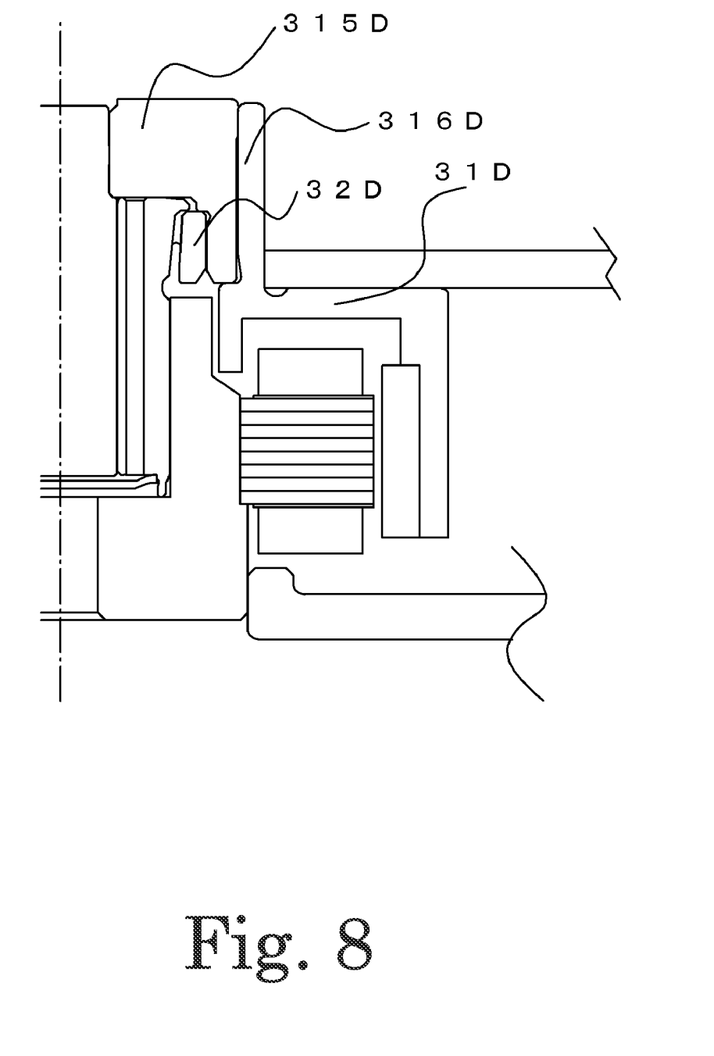
FIG. 8 is a partial cross-sectional view of a spindle motor according to another example modification of a preferred embodiment of the present invention.

In addition, as illustrated in FIG. 8, in an example modification of the above-described preferred embodiment in which a rotor hub 31D includes an inner member 315D and an outer member 316D, the inner member 315D may include a bushing 32D.

Motors according to preferred embodiments of the present invention are applicable to a variety of disk drive apparatuses. In other words, each of such a variety of disk drive apparatuses includes a motor according to a preferred embodiment of the present invention and a disk located on a rotor hub of the motor. For example, motors according to preferred embodiments of the present invention may be arranged to rotate a magnetic disk, an optical disk, a color wheel, or the like.

In addition, motors according to preferred embodiments of the present invention may be used as motors for applications other than disk drive apparatuses. For example, motors according to preferred embodiments of the present invention may be used as motors arranged to rotate impellers of fans or the like.

In addition, motors according to preferred embodiments of the present invention are applicable to a variety of electronic devices.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
    a sleeve including a bearing hole;
    a holding portion including a hole or a recessed portion configured to accommodate a portion of the sleeve;
    a stator located radially outside of the holding portion, and including a plurality of coils; and
    a rotor hub configured to rotate about a central axis extending in a vertical direction; wherein
    the rotor hub includes a circular first horizontal surface, a cylindrical surface, and an annular second horizontal surface;
    the first horizontal surface is located above the sleeve;
    the cylindrical surface extends downward from the first horizontal surface;
    the second horizontal surface is located above the stator;
    the rotor hub further includes a projecting portion that projects downward from the second horizontal surface, and surrounds the sleeve or the holding portion;
    the cylindrical surface and an outer circumferential surface of the sleeve are configured to together define a tapered gap therebetween where a radial distance between the cylindrical surface and the outer circumferential surface of the sleeve decreases with increasing height;
    the tapered gap includes a liquid surface of a lubricating fluid defined therein;
    the holding portion, the projecting portion, and the coils are radially arranged in order;
    at least portions of the holding portion, the projecting portion, and the coils are positioned to radially overlap with one another;
    an outer circumferential surface of the holding portion is located radially opposite to an inner circumferential surface of the projecting portion with a minute gap intervening therebetween;
    the minute gap has a radial width smaller than the radial distance between the cylindrical surface and the outer circumferential surface of the sleeve; and
    the minute gap is located below the tapered gap.

2. The spindle motor according to claim 1, wherein an upper surface of the holding portion is located at an axial level higher than an axial level of the second horizontal surface.

3. The spindle motor according to claim 1, wherein
    the inner circumferential surface of the projecting portion is located radially outward of the cylindrical surface; and
    the tapered gap is located radially inward of the minute gap.

4. The spindle motor according to claim 1, wherein the tapered gap has an axial dimension greater than an axial dimension of the minute gap.

5. The spindle motor according to claim 1, wherein
    the rotor hub is defined by two or more members; and
    a member including the cylindrical surface and a member including the inner circumferential surface of the projecting portion are separate members.

6. The spindle motor according to claim 5, wherein
    the rotor hub further includes an inner member and an outer member;
    the inner member includes:
        a circular first horizontal plate portion extending radially, and including the first horizontal surface on a lower side thereof; and
        a cylindrical inner tubular portion extending downward from the first horizontal plate portion, and including the cylindrical surface on a radially inner side thereof;
    the outer member includes:
        a circular second horizontal plate portion extending radially, and including the second horizontal surface on a lower side thereof; and
        a cylindrical outer tubular portion extending upward from the second horizontal plate portion;
    the outer tubular portion is located radially outside of the inner tubular portion; and
    the outer tubular portion is in direct contact with the inner tubular portion or in indirect contact with the inner tubular portion with another member intervening therebetween.

7. The spindle motor according to claim 6, wherein
    the outer tubular portion includes a press fit portion extending upward from the outer tubular portion; and
    an inner surface of the press fit portion is in direct contact with an outer circumference of the inner tubular portion or in indirect contact with the outer circumference of the inner tubular portion with another member intervening therebetween.

8. The spindle motor according to claim 7, wherein the press fit portion is located at an axial level higher than an axial level of an upper surface of the sleeve.

9. The spindle motor according to claim 6, further comprising an adhesive located between an inner circumferential surface of the outer tubular portion and an outer circumferential surface of the inner tubular portion.

10. The spindle motor according to claim 6, wherein a lower surface of the inner tubular portion is in contact with an upper surface of the second horizontal plate portion.

11. The spindle motor according to claim 6, further comprising an adhesive located between a lower surface of the inner tubular portion and an upper surface of the second horizontal plate portion.

12. A disk drive apparatus comprising:
the spindle motor according to claim 1; and
a disk located on the rotor hub.

13. A spindle motor comprising:
a sleeve including a bearing hole;
a holding portion including a hole or a recessed portion configured to accommodate a portion of the sleeve;
a stator located radially outside of the holding portion, and including a plurality of coils; and
a rotor hub configured to rotate about a central axis extending in a vertical direction; wherein
the rotor hub includes a circular first horizontal surface, a cylindrical surface, and an annular second horizontal surface;
the first horizontal surface is located above the sleeve;
the cylindrical surface extends downward from the first horizontal surface;
the second horizontal surface is located above the stator;
the rotor hub further includes a projecting portion that projects downward from the second horizontal surface, and surrounds the sleeve or the holding portion;
the cylindrical surface and an outer circumferential surface of the sleeve are configured to together define a tapered gap therebetween where a radial distance between the cylindrical surface and the outer circumferential surface of the sleeve decreases with increasing height;
the tapered gap includes a liquid surface of a lubricating fluid defined therein;
a portion of the tapered gap which is above the liquid surface is filled with the lubricating fluid;
the holding portion, the projecting portion, and the coils are located radially in an order named;
at least portions of the holding portion, the projecting portion, and the coils are positioned to radially overlap with one another;
an outer circumferential surface of the holding portion is located radially opposite to an inner circumferential surface of the projecting portion with a minute gap intervening therebetween;
the minute gap has a radial width smaller than the radial distance between the cylindrical surface and the outer circumferential surface of the sleeve;
the minute gap is located below the tapered gap;
the rotor hub is defined by two or more members, and a member including the cylindrical surface and a member including the inner circumferential surface of the projecting portion are separate members;
the rotor hub further includes an inner member and an outer member;
the inner member includes:
a circular first horizontal plate portion extending radially, and including the first horizontal surface on a lower side thereof; and
a cylindrical inner tubular portion extending downward from the first horizontal plate portion;
the outer member includes:
a circular second horizontal plate portion extending radially, and including the second horizontal surface on a lower side thereof; and
a cylindrical outer tubular portion extending upward from the second horizontal plate portion, and including the cylindrical surface on a radially inner side thereof;
the outer tubular portion is located radially outside of the inner tubular portion; and
the outer tubular portion is in direct contact with the inner tubular portion or in indirect contact with the inner tubular portion with another member intervening therebetween.

14. The spindle motor according to claim 13, wherein an upper surface of the holding portion is located at an axial level higher than an axial level of the second horizontal surface.

15. The spindle motor according to claim 13, wherein
the inner circumferential surface of the projecting portion is located radially outward of the cylindrical surface; and
the tapered gap is located radially inward of the minute gap.

16. The spindle motor according to claim 13, wherein the tapered gap has an axial dimension greater than an axial dimension of the minute gap.

17. The spindle motor according to claim 13, wherein
the outer tubular portion includes a press fit portion extending upward from the outer tubular portion; and
an inner surface of the press fit portion is in direct contact with an outer circumference of the inner tubular portion or in indirect contact with the outer circumference of the inner tubular portion with another member intervening therebetween.

18. The spindle motor according to claim 17, wherein the press fit portion is located at an axial level higher than an axial level of an upper surface of the sleeve.

19. The spindle motor according to claim 13, further comprising an adhesive located between an inner circumferential surface of the outer tubular portion and an outer circumferential surface of the inner tubular portion.

20. The spindle motor according to claim 13, wherein a lower surface of the inner tubular portion is in contact with an upper surface of the second horizontal plate portion.

21. The spindle motor according to claim 13, further comprising an adhesive located between a lower surface of the inner tubular portion and an upper surface of the second horizontal plate portion.

22. A disk drive apparatus comprising:
the spindle motor according to claim 13; and
a disk located on the rotor hub.

* * * * *